US012320160B2

(12) United States Patent
Andersen

(10) Patent No.: US 12,320,160 B2
(45) Date of Patent: Jun. 3, 2025

(54) CHILD SAFETY LOCK

(71) Applicant: Jesper Birk Andersen, Kowloon (CN)

(72) Inventor: Jesper Birk Andersen, Kowloon (CN)

( * ) Notice: Subject to any disclaimer, the term of this patent is extended or adjusted under 35 U.S.C. 154(b) by 111 days.

(21) Appl. No.: 17/965,265

(22) Filed: Oct. 13, 2022

(65) Prior Publication Data

US 2023/0151644 A1 May 18, 2023

(30) Foreign Application Priority Data

Nov. 17, 2021 (GB) ...................................... 2116533

(51) Int. Cl.
*E05B 65/00* (2006.01)
*E05C 19/18* (2006.01)

(52) U.S. Cl.
CPC ........ *E05B 65/0014* (2013.01); *E05C 19/184* (2013.01)

(58) Field of Classification Search
CPC .... E05C 19/184; E05B 65/0014; E05B 65/46; E05B 63/128
See application file for complete search history.

(56) References Cited

U.S. PATENT DOCUMENTS 3,554,591 A * 1/1971 Rowe .................... E05C 19/063 292/303
4,068,872 A * 1/1978 Smith ..................... E05C 19/06 292/87
4,667,557 A * 5/1987 Nichols .................... G10C 3/02 984/56
4,865,369 A * 9/1989 Parker ................... E05C 19/184 292/291

(Continued)

FOREIGN PATENT DOCUMENTS

CN 110748240 A 2/2020
EP 1255006 A1 11/2002

(Continued)

OTHER PUBLICATIONS

Great Britain Search Report for Application No. GB2116533.7 dated Apr. 28, 2022, 2 pages.

*Primary Examiner* — Christine M Mills
*Assistant Examiner* — Faria F Ahmad
(74) *Attorney, Agent, or Firm* — Lippes Mathias LLP

(57) ABSTRACT

A child safety lock for a cupboard or drawer comprising a movable door or drawer and a fixed frame member, the safety lock comprising: a latch member, rail attachment member, a fixing screw and a catch member, the latch part to be fitted on a surface of the fixed frame member, by means of the rail attachment member and the fixing screw; the latch member including a laterally extending tongue, and the rail attachment member including a groove housing comprising a receiving groove to receive the tongue by sliding the tongue into the groove thus retaining the latch part and the rail attachment means together, and a through hole centrally in the tongue such that when tongue is located in the groove the fixing screw may be screwed through the through hole and into the groove housing this securing the latch part to the rail attachment member, the safety lock also including a C-shaped clamp with opposing clamp sides and a connecting base to fit around the fixed frame member and the rail attachment means.

15 Claims, 18 Drawing Sheets

(56) References Cited

U.S. PATENT DOCUMENTS 5,409,276 A * 4/1995 Engasser ............... E05C 19/188 292/281
5,626,372 A * 5/1997 Vogt .................... E05B 65/0014 292/87
5,647,618 A * 7/1997 Lamberth ........... E05B 65/0014 292/19
5,946,952 A * 9/1999 Mintchenko .............. E05C 7/00 70/32
6,016,629 A * 1/2000 Sylvester .................. E05D 7/12 49/55
6,942,257 B2 * 9/2005 Wong .................. E05B 65/0014 292/228
6,955,380 B1 * 10/2005 Barr ........................ E05C 19/06 292/84
7,044,509 B2 * 5/2006 Radel ........................ E05C 1/04 292/147
7,300,276 B2 * 11/2007 Sun ......................... F23Q 2/285 431/153
7,547,050 B1 * 6/2009 Miglieri .............. E05B 65/0014 292/DIG. 60
9,534,422 B1 * 1/2017 Andersen ................ E05B 65/06
9,624,702 B1 * 4/2017 Faulkner ............. E05B 65/0035
10,174,518 B2 * 1/2019 Andersen ................ E05B 65/46
10,208,510 B1 * 2/2019 Van Dyck ................. E05C 1/10
10,689,890 B2 * 6/2020 Taylor ................... E05C 19/184
11,712,112 B2 * 8/2023 Wang ..................... A47B 88/50 312/333
2006/0152018 A1 * 7/2006 Crossley ............. E05B 65/0014 292/246
2009/0066203 A1 * 3/2009 Zielinski ................ E05B 65/46 292/1
2016/0305159 A1 * 10/2016 Andersen ................ E05B 17/06
2017/0130487 A1 * 5/2017 Andersen ................ E05B 65/44
2019/0032372 A1 1/2019 Andersen
2022/0081935 A1 * 3/2022 Thompson .............. E05B 65/46
2023/0295960 A1 * 9/2023 Andersen ................ E05B 65/46 292/248

FOREIGN PATENT DOCUMENTS

GB 2537625 A 10/2016
GB 2552466 A 1/2018
GB 2553270 A 3/2018

* cited by examiner

CHILD SAFETY LOCK

CROSS-REFERENCE TO RELATED APPLICATIONS

This application claims priority under 35 U.S.C. § 119, and the benefit of Great Britain Patent Application No. 2116533.7, filed Nov. 17, 2021 and titled "CHILD SAFETY LOCK", the entirety of which application is hereby incorporated by reference as if fully set forth herein.

FIELD OF THE INVENTION

The present invention relates to a retrofittable safety lock for cupboards, cabinet doors and the like, and, more particularly, "child-proof" latches that include features which make them difficult to be actuated by small children.

BACKGROUND (PRIOR ART)

A variety of materials are used for the work surface of kitchen cupboards and sideboards. Materials such as quartz, granite, wood, acrylic, laminate etc. are often used for their aesthetic quality and finish since these surfaces can be a very dominant feature of a room.

These sideboards are commonly used in daily life in kitchens, bedrooms, offices, etc. to store a wide range of articles, some of which may be harmful to children. Small children may also attempt to climb on, or even in, cupboards and cabinets in an effort to hide. Cupboards and cabinets may house many types of materials which may be potentially hazardous to children such as medicines, household cleaners, knives, tools, paint, etc.

To prevent young children from accessing these storage areas, numerous items have been patented and sold, most of a multi-piece assembly. Generally, some sort of a longitudinal member with a hook portion is attached to either side surface of a cupboard or cupboard handle to limit the amount the cupboard door may be opened.

The hook portion may engage with the cupboard handles or fixings on the cupboard doors. A latch on the hook may be depressed by an adult to release the hook from the cupboard handles or fixings on the cupboard doors.

While the disengagement of the latch is relatively easy for an adult, the latches are intended to be difficult to manipulate by a child.

These products are also often fixed to the top inner surface of the cupboard so that they are most easily releasable from above and therefore more easily releasable by adults than small children.

Such a lock is known from GB 2553270. These products often need to be fixed to the inside surface of the cupboard or drawer, which often includes the use of screws or adhesive. Adults find it difficult to correctly fix such safety locks to existing cupboards with the confidence that they have been fitted correctly and will function correctly during use and effectively prevent children accessing a cupboard and yet not make the task of an adult opening the cupboard too onerous.

STATEMENT OF INVENTION

According to the invention there is provided a retrofittable safety lock for limiting movement of a movable first element with respect to a fixed second element as defined in the appended claims.

DETAILED DESCRIPTION

Figure 1:
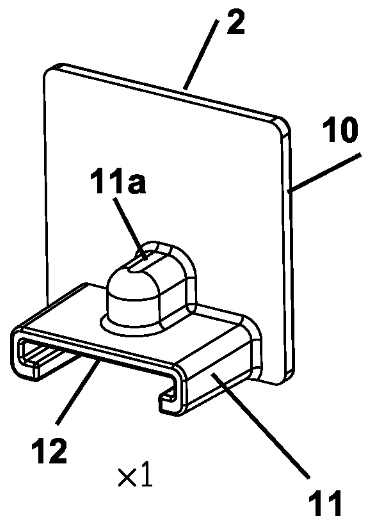
FIG. 1: shows a perspective view of a set of components of a first embodiment the safety lock of the invention.
Figure 1:
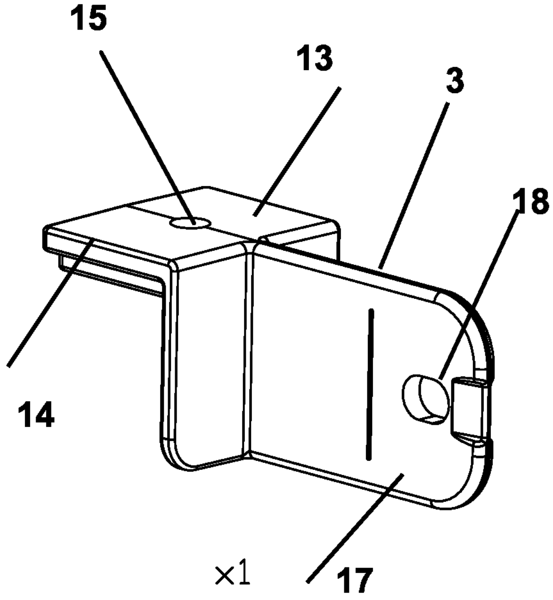
Figure 1:
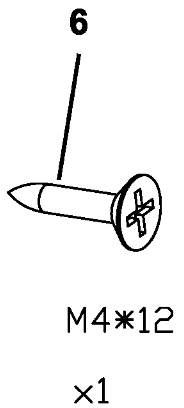
Figure 1:
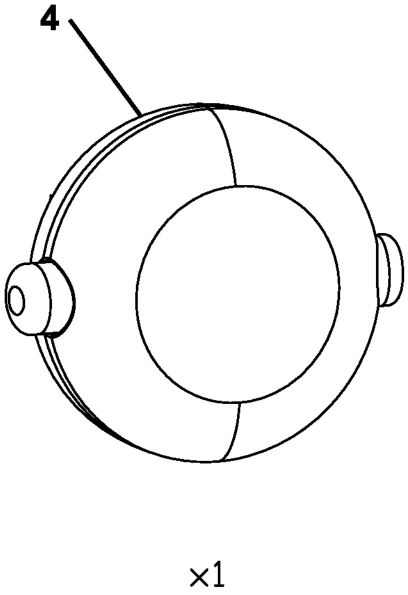
Figure 2:
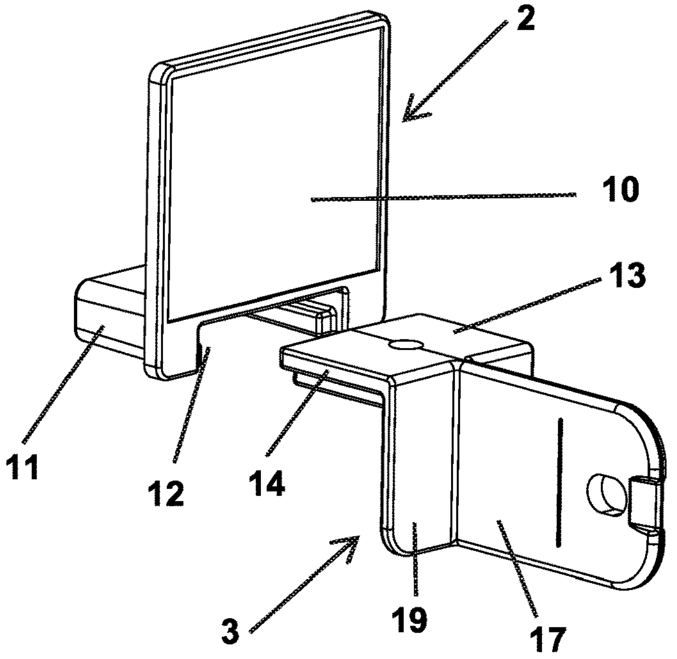
FIG. 2: shows a perspective view of a first step in the assembly of the latch member of the safety lock of the first embodiment.
Figure 3:
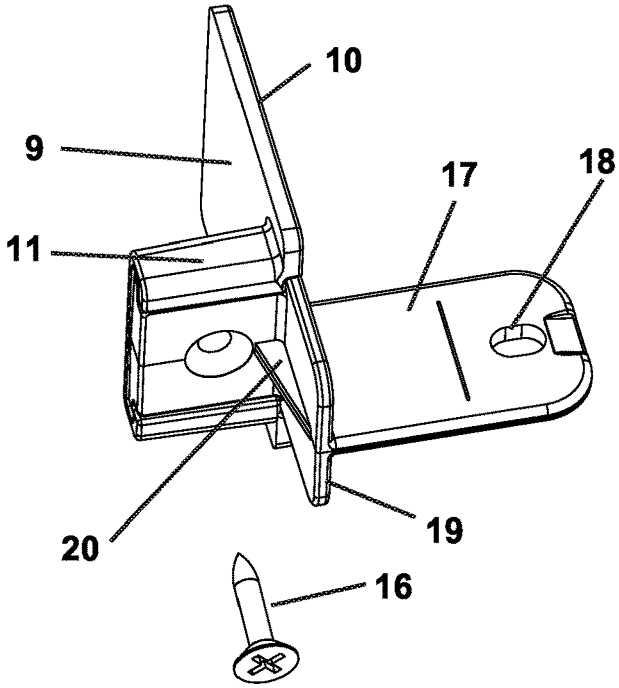
FIG. 3: shows a perspective view of a subsequent step in the assembly of the latch member of the safety lock of the first embodiment.
Figure 4:
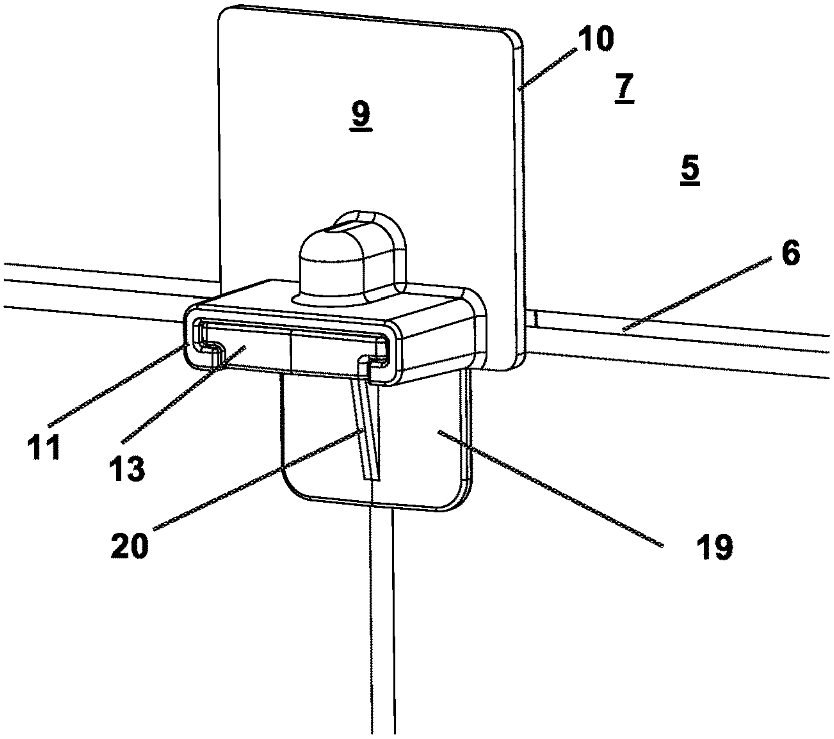
FIG. 4: shows a perspective view of the assembled latch member of the safety lock of the first embodiment located in position on the cupboard frame as seen from the inside of the cupboard.
Figure 5:
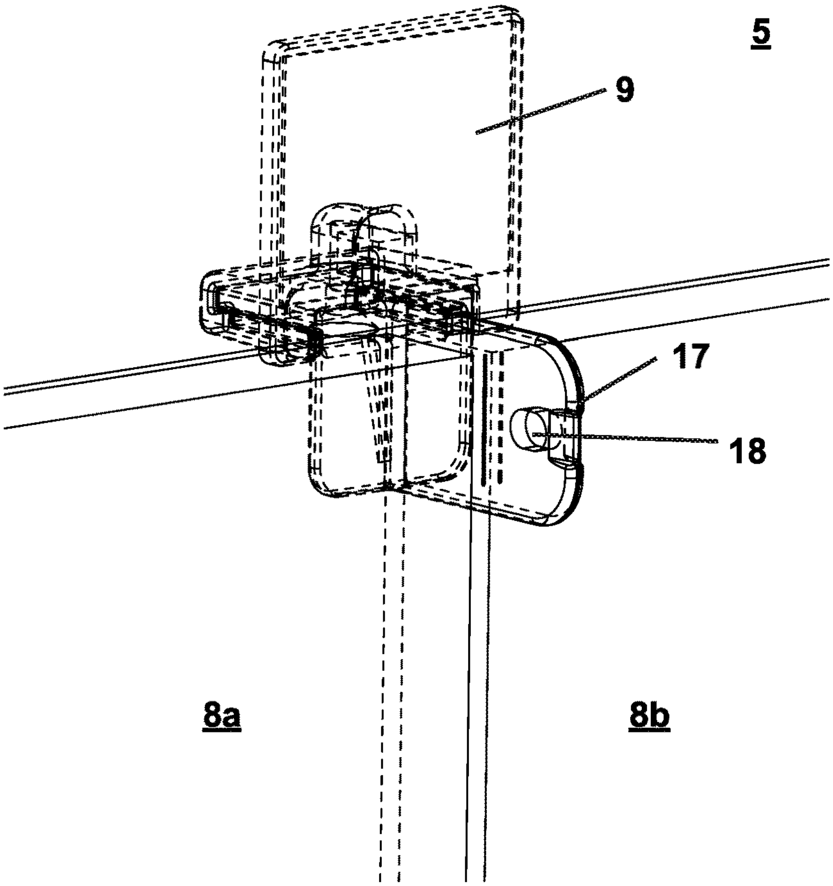
FIG. 5: shows a perspective view of the assembled latch member of the safety lock of FIG. 4. seen from the outside of the cupboard to which the safety lock is attached.

FIGS. 1 to 7 show a retrofittable safety lock 1 according to a first embodiment of the invention in its four component parts including a rail attachment member 2, a catch member 4, a screw 6, and a latch part 3. In this first embodiment the safety lock is adapted to be fitted to cupboards which comprise a wooden frame as shown in FIGS. 4 and 5 which includes a horizontal frame element 5. The term wooden is used here to include all types of manufactured artificial wood including chipboard, mdf (medium density fibreboard), and the like and other resin or glue based products exhibiting the properties of wood. Such a wooden frame element 5 typically comprises planar surface 7 being coplanar with the cupboard doors when closed and a horizontal lower edge 6. Cupboard doors 8*a*, 8*b* are arranged below the frame element 5.

Figure 6:
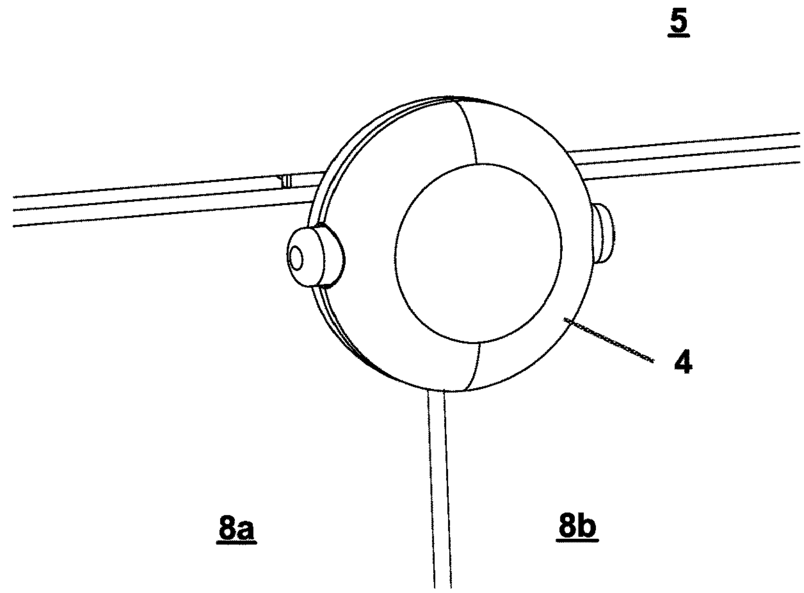
FIG. 6: shows a perspective view of the safety lock of FIG. 5 with the catch member attached.
Figure 7:
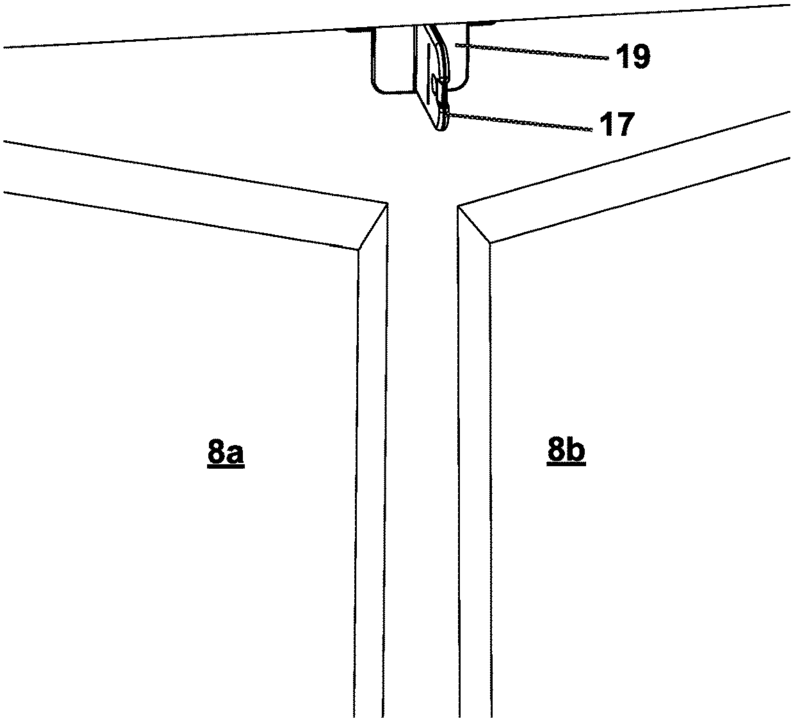
FIG. 7: shows a perspective view of the safety lock of FIG. 5 with the catch member removed and the cupboard doors open.
Figure 8:
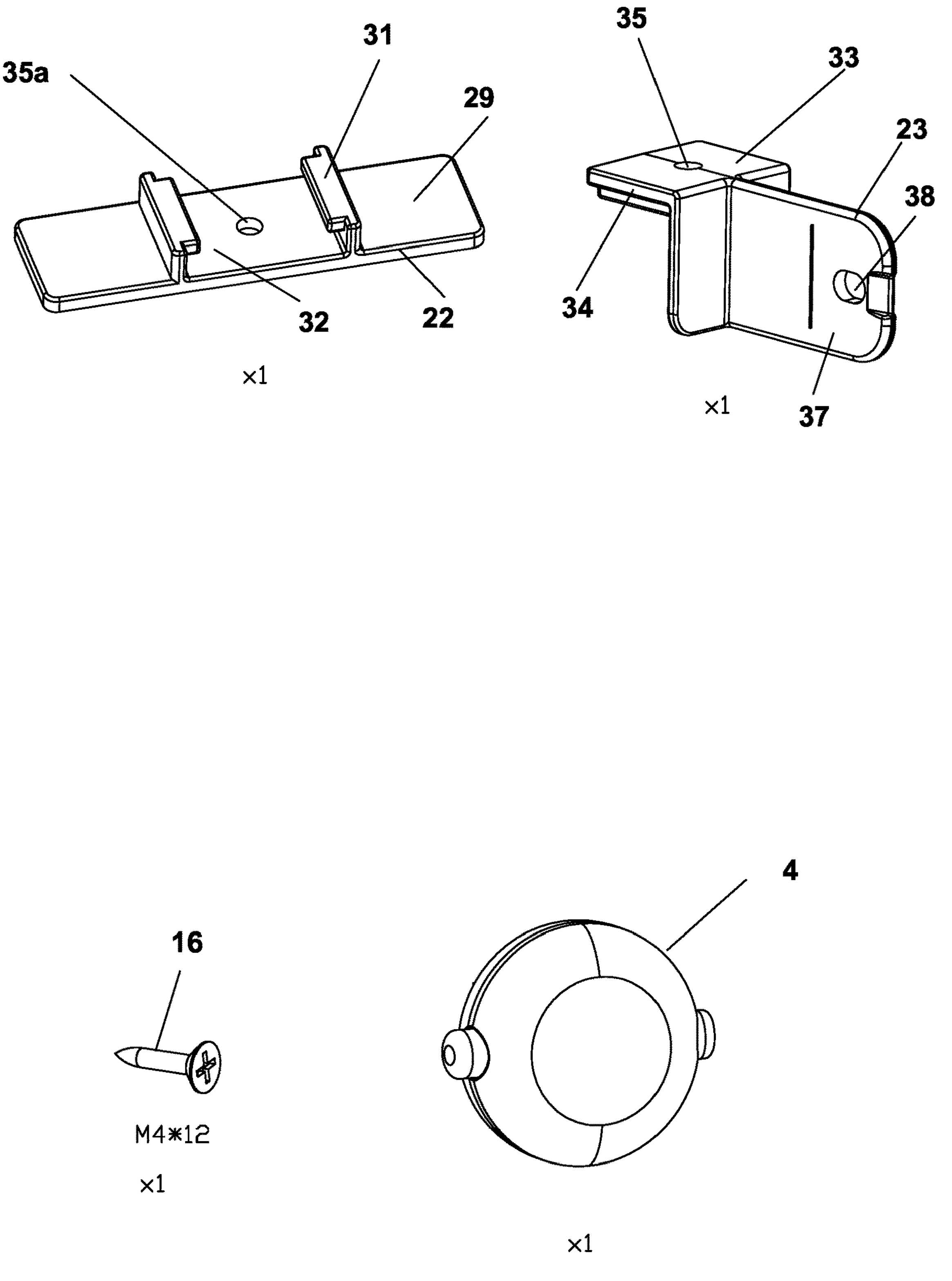
FIG. 8: shows a perspective view of a set of components of a second embodiment the safety lock of the invention.
Figure 9:
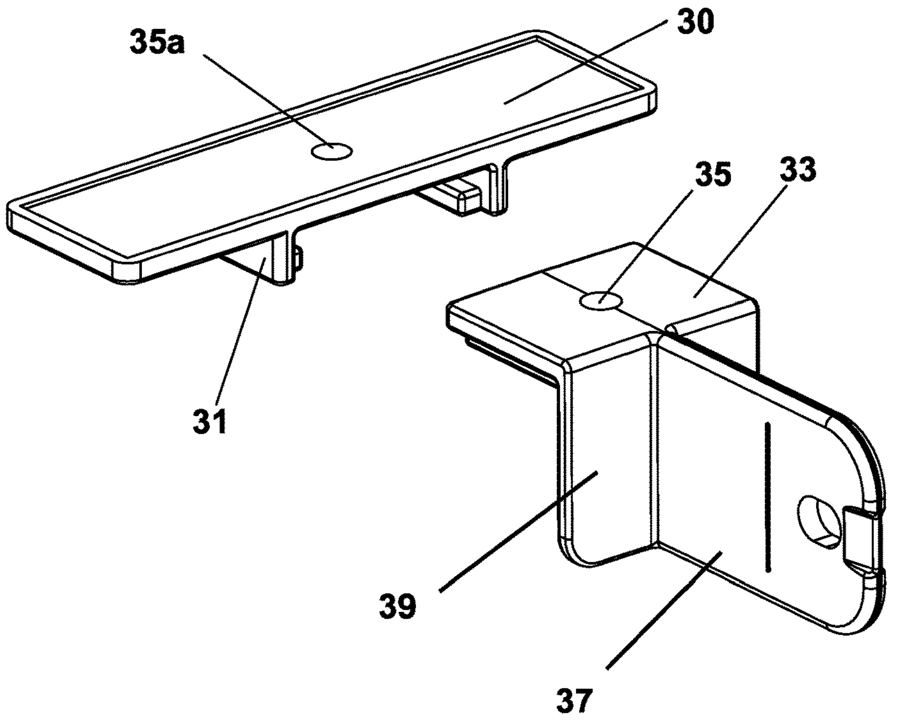
FIG. 9: shows a perspective view of a first step in the assembly of the latch member of the safety lock of the second embodiment.

In this embodiment, it can be seen that the rail attachment member 2 comprises a square shaped web 9 which provides an attachment surface 10 for securing to the planar surface of the frame element 5 preferably by means of adhesive. The relatively large surface area of at least 2 $cm^2$ of the attachment surface 10 provides for a strong attachment of the rail attachment member 2 to the frame element 5. The rail attachment member 2 also comprises a groove housing 11 arranged orthogonally to the web 9 and comprises a groove 12 designed to receive a tongue 13 of the latch part 3, which tongue 13 comprises correspond flanges 14 on either side which snugly fit into the groove 12. The tongue 13 also comprises a through hole 15 for receiving a retaining screw 6, so that to affix the latch part 3, the user slides the tongue 13 in the groove 12 as shown best in FIG. 2. The tongue 13 and groove 12 are slid together to the fullest extent possible, as shown in FIG. 3, and as determined by corresponding stops at the end of the tongue 13 and groove 12 respectively, at which point the through hole 15 is aligned with a retaining hole (not shown) inside an abutment 11*a* the groove housing 11. The stop means is provided by a supporting wall 19 arranged orthogonally to the tongue 13 and reinforced by an angular web 20. Thus, the user screws in the retaining screw 6 through the through hole 15 and into the retaining hole thus securing the latch part 3 to the rail attachment member in a manner in which any rotation or sideways movement is prevented. The rail attachment member 2, together with the latch part 3, is then fixedly attached to the inside surface of the frame element, preferably by means on adhesive, such that a latching protrusion 17 of the latch part 3, which in turn is arranged orthogonally to the tongue 13 and the supporting wall 19, extends outwardly between the cupboard doors 8*a*, 8*b*, as shown in FIGS. 6 and 7. The latch part 3 attached to the frame element 5 in a fixed and secure state, such that the catch part 4 can be engaged with the protrusion 17 by means of the latching hole 18, by the user to secure the cupboard, in a manner which is already known for example from GB 2553270.

Figure 10:
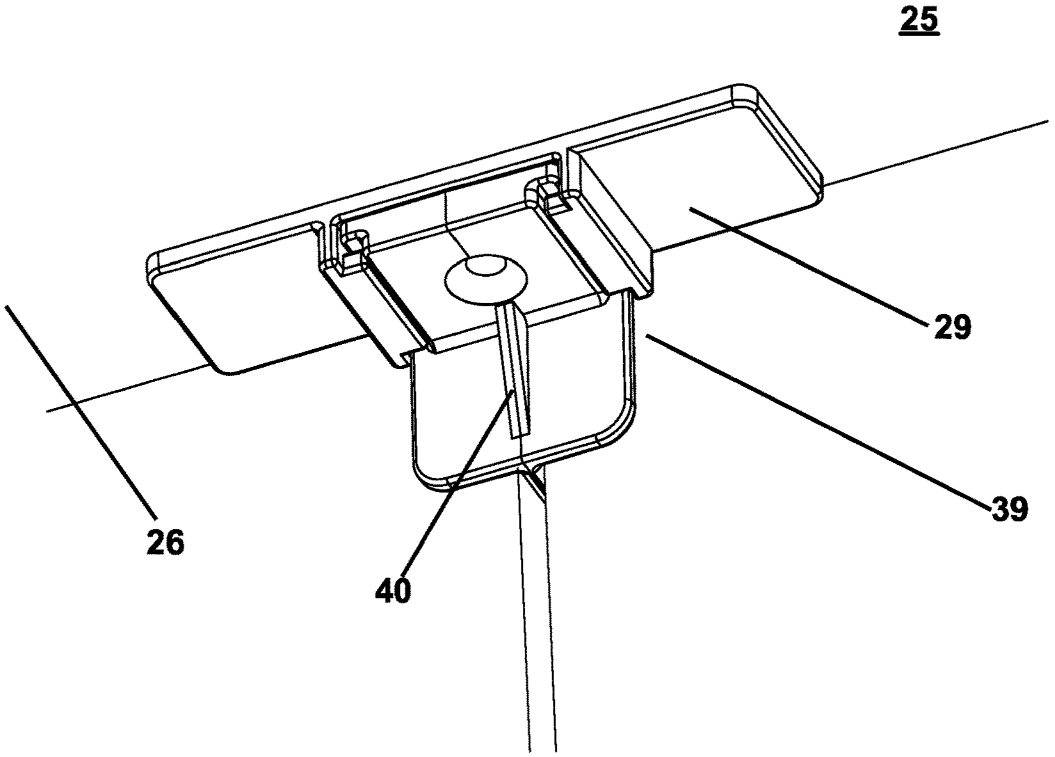
FIG. 10: shows a perspective view of a second step in the assembly of the latch member of the safety lock of the second embodiment.

FIGS. 8 to 12 show a retrofittable safety lock 21 according to a second embodiment of the invention in its four component parts including a rail attachment member 22, a screw 16, a catch member 4, which may be the same as in the first embodiment, and a latch part 23. In this second embodiment the safety lock is adapted to be fitted to cupboards which comprise a wooden frame as shown in FIG. 10 which includes a horizontal frame element 25. In this embodiment however the rail attachment member is adapted to be attached to the horizontal plane of the horizontal lower edge 26 of the frame element 25 instead of the vertically extending surface as is the case for the first embodiment.

Figure 11:
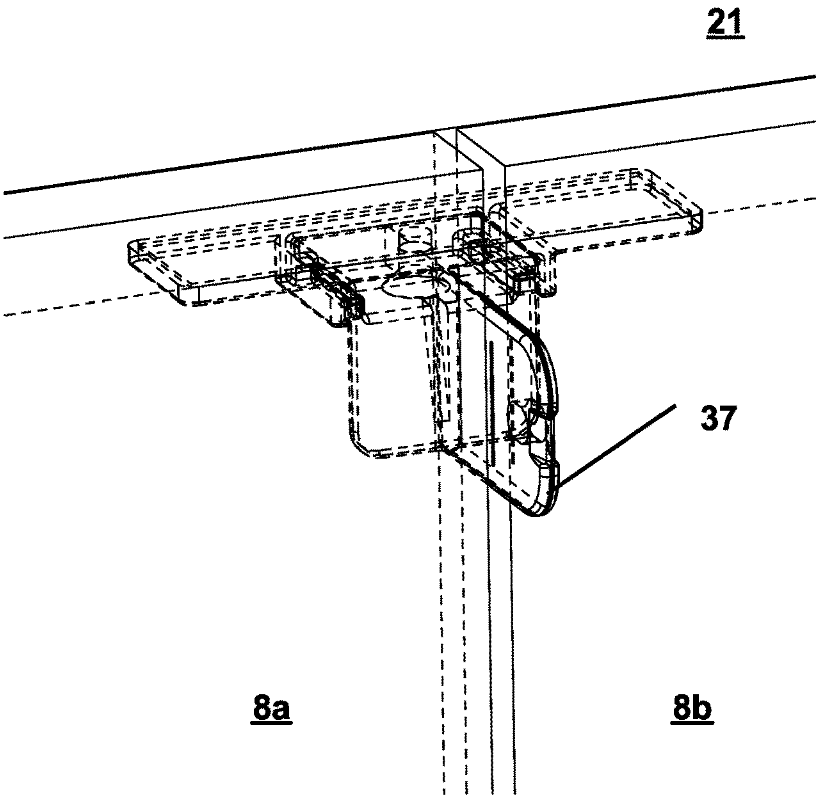
FIG. 11: shows a perspective view of the assembled latch member of the safety lock of FIG. 10. seen from the outside of the cupboard to which the safety lock is attached.
Figure 11:
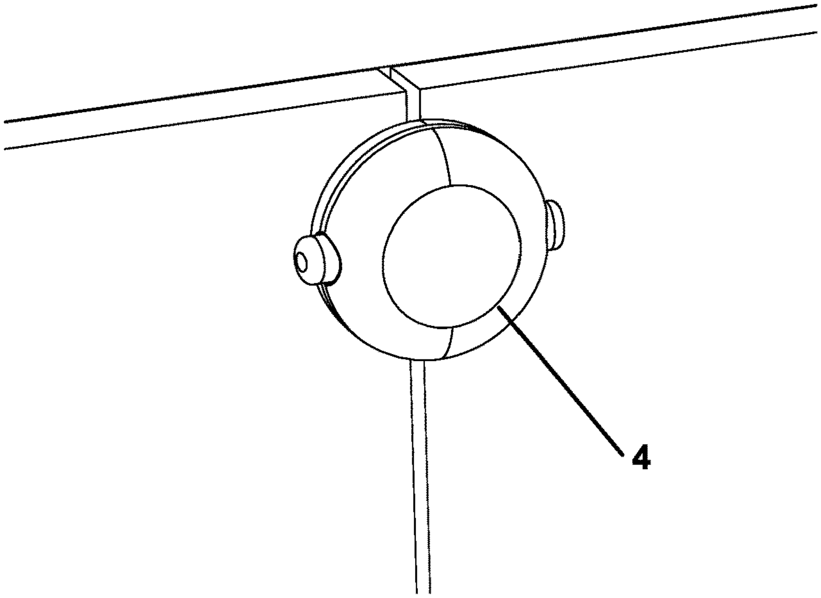
Figure 12:
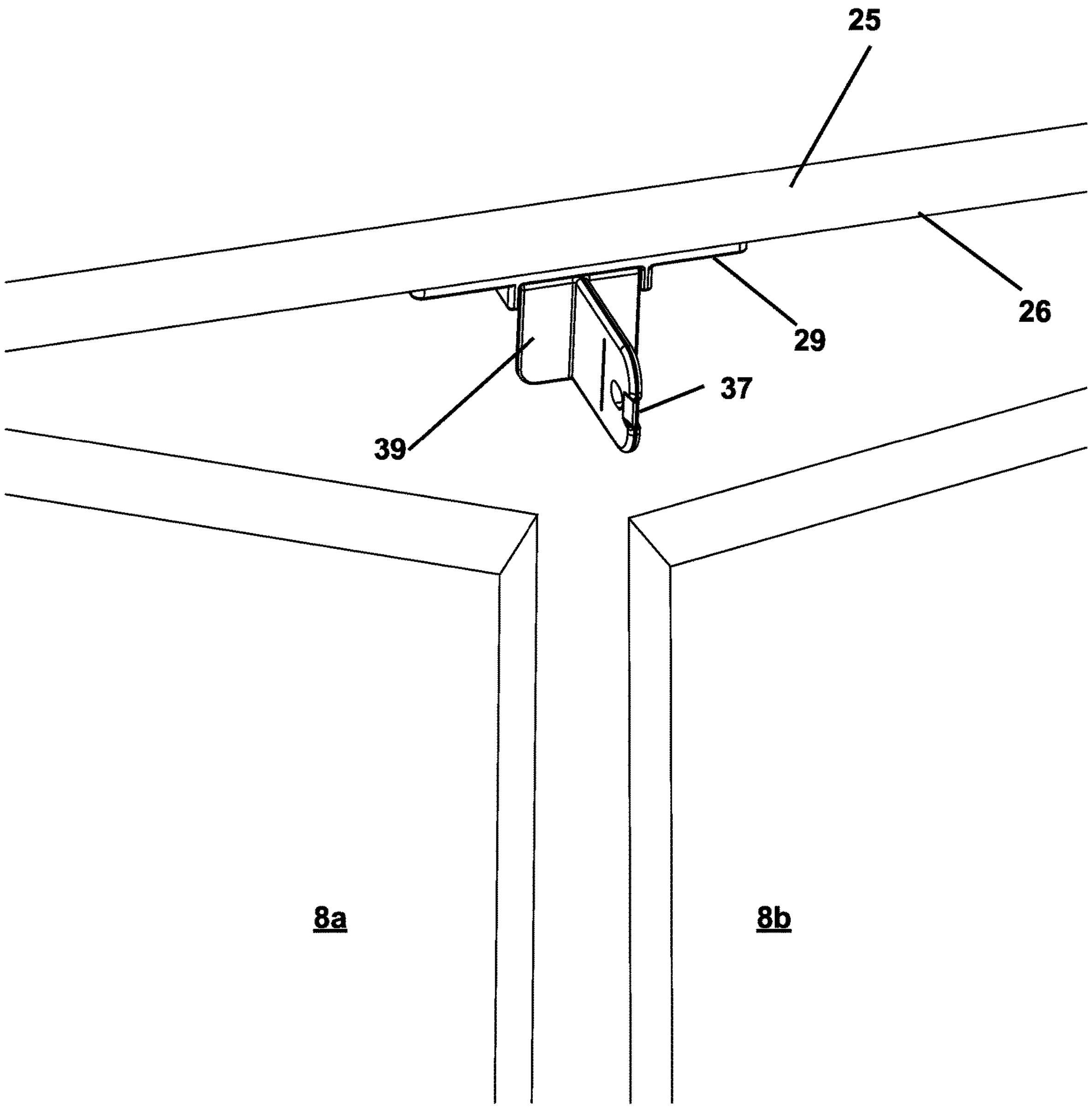
FIG. 12: shows a perspective view of the safety lock of FIG. 10 with the catch member removed and the cupboard doors open.
Figure 13:
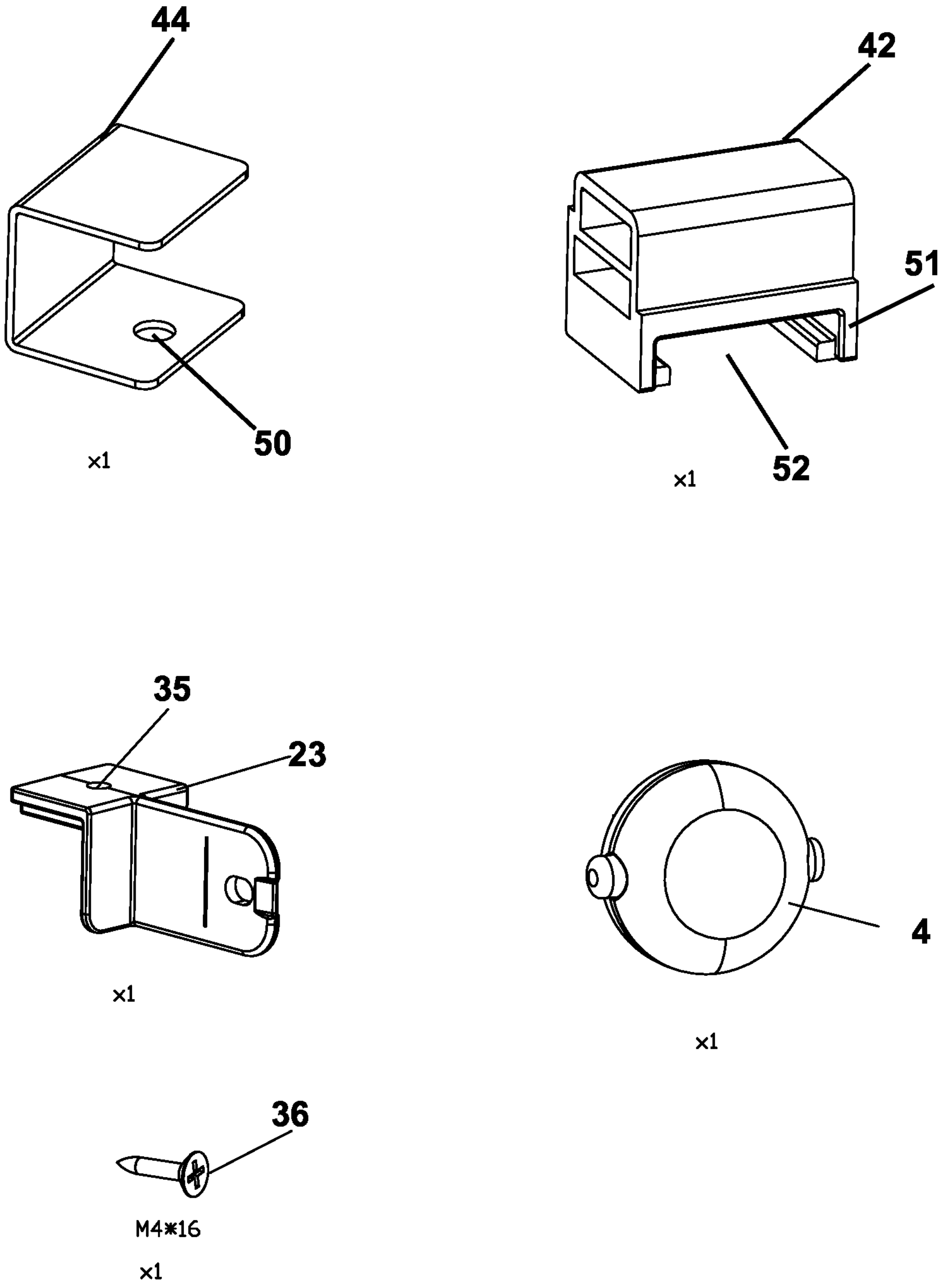
FIG. 13: shows a perspective view of a set of components of a third embodiment the safety lock of the invention.

In this second embodiment, it can be seen that the rail attachment member 22 comprises a square shaped elongate web 29 which provides an attachment surface 30 for securing to the edge of the frame element 25 preferably by means of adhesive. The relatively large surface area of at least 2 $cm^2$ of the attachment surface 30 provides for a strong attachment of the rail attachment member 22 to the frame element 25. The rail attachment member 22 also comprises a groove housing 31 arranged in the same plane as the web 29 and comprises a groove 32 designed to receive a tongue 33 of the latch part 23, which tongue 33 comprises corresponding flanges 34 on either side which snugly fit into the groove 32. The tongue 33 also comprises a through hole 35 for receiving the retaining screw 16, so that to affix the latch part 23, the user slides the tongue 33 in the groove 32 as shown best in FIG. 9. The tongue 33 and groove 22 are slid together to the fullest extent possible, as shown in FIG. 10, and as determined by corresponding stops at the end of the tongue 33, at which point the through hole 35 is aligned with a corresponding retaining hole 35*a* extending through the web 29 inside the groove housing 31. The stops are provided by a supporting wall 39 arranged orthogonally to the tongue 33 and reinforced by an angular web 40. Thus, the user screws in the retaining screw 36 through the through hole 35 and into the retaining hole 35*a* and further into the frame element 25 thus securing the latch part 33 to the rail attachment member 22 and in turn securing both to the frame element 25 in such a way that any rotation or sideways movement is prevented. The edge of the web 29 is aligned by the user to the edge of the frame element 25 and pressed together to fix by means of adhesive, which has either been applied by the user or pre-applied and the user merely removes a cover strip in a known way. By this means and the adhesive applied to the attachment surface 30, fixes the rail attachment means 22 and latch part 3 in position such that a latching protrusion 37 of the latch part 23, which in turn is arranged orthogonally to the tongue 33 and the supporting wall 39, extends outwardly between the cupboard doors 8*a*, 8*b*, in a fixed and secure state, such that the catch part 4 can be engaged with the protrusion 37 by means of the latching hole 38, by the user to secure the cupboard, in the same manner as in the first embodiment and as shown in FIGS. 11 and 12.

FIGS. 13 to 18 show a retrofittable safety lock 21 according to a third embodiment of the invention in its five component parts including a rail attachment member 42, a C-shaped clamp 44, a screw 36, a catch member 4, which may be the same as in the first embodiment, and a latch part

Figure 14:
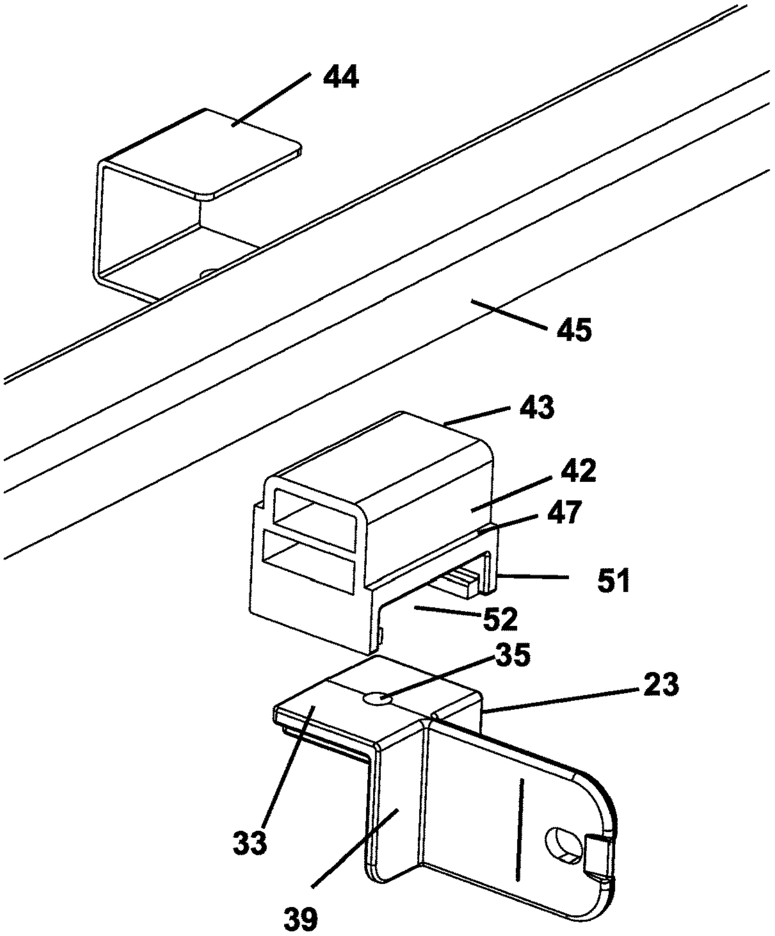
FIG. 14: shows a perspective view of a first step in the assembly of the latch member of the safety lock of the third embodiment.

23, which is also the same as in the previous embodiment. In this third embodiment the safety lock is adapted to be fitted to cupboards which comprise a metal frame as shown in FIG. 14 which includes a horizontal frame element 45, which typically has an inverted U-shaped profile with the front side 49 longer than the rear side 48 as shown in cross section in FIG. 15. In this embodiment however the rail attachment member 42 is adapted to be attached to the horizontal frame element 45 by comprising means of shaped insert section 43 which is shaped to correspond with the internal section of the frame element 45 so that the insert section fits snugly inside the frame element 45. The insert section also includes ledges 46, 47 which are dimensioned to correspond with the external edges of the front and rear sides 48, 49 of the frame element 45 when the insert section 43 is fitted inside the frame element 45.

Figure 15:
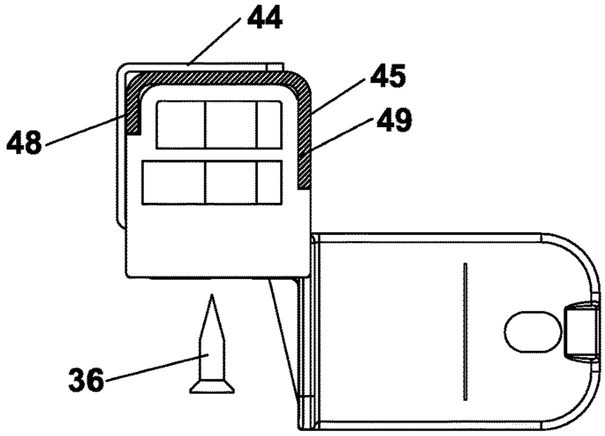
FIG. 15: shows a perspective view of a subsequent step in the assembly of the latch member of the safety lock of the third embodiment.

In this third embodiment, it can be seen that a further rail attachment component is provided in the form of a C-shaped clamp 44 which includes two opposing clamp sides and a connecting base and one of the sides being provided with a clamp hole 50. As in the previous embodiments, the rail attachment member 42 also comprises a groove housing 51 comprising a groove 52 designed to receive a tongue 33 of the latch part 23, which tongue 33 comprises correspond flanges 34 on either side which snugly fit into the groove 52. The latch part 23 is the same as in previous embodiments and comprises a through hole 35 for receiving a retaining screw 36, so that to affix the latch part 23, the user slides the tongue 33 in the groove 52 as shown best in FIG. 14. The tongue 33 and groove 52 are slid together to the fullest extent possible, as shown in FIG. 15, and as determined by the supporting wall 39 at the end of the tongue 33. The groove 52 is dimensioned so that when the tongue 33 is in place there is sufficient room for the C-shaped clamp side with the hole 50 of the C-shaped clamp 44 to be slid into the same groove 52 above the tongue 33, and from the opposite end of the groove 52, so that together they snugly fit as shown in FIG. 15, with the other clamp side resting on the frame element 45 and the clamp hole 50 aligned with the through hole 35 in the latch tongue 33. Thus, the user screws in the retaining screw 36 through the through hole 35 and into the clamp hole 50 and further into the inside wall of the groove housing 51 thus securing the latch part 33 to the rail attachment member 42 and in turn securing both to the frame element 45 in a manner in which any rotation or sideways movement is prevented.

Figure 16:
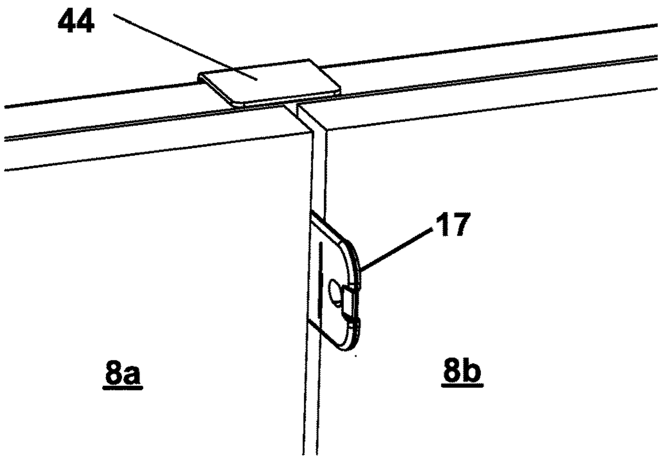
FIG. 16: shows a perspective view of the assembled latch member of the safety lock of FIG. 13. seen from the outside of the cupboard.
Figure 17:
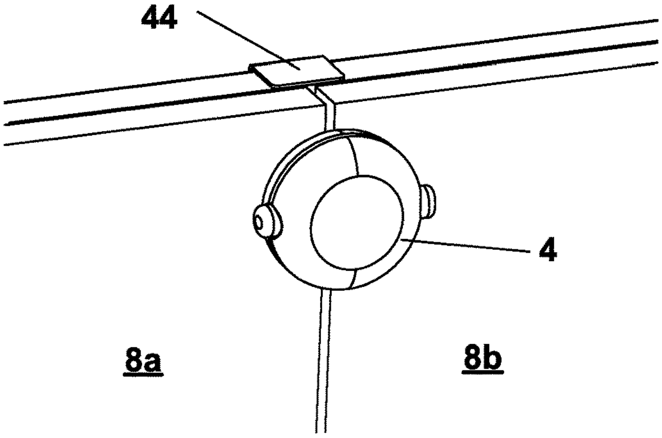
FIG. 17: shows a perspective view of the safety lock of FIG. 13 with the catch member attached.
Figure 18:
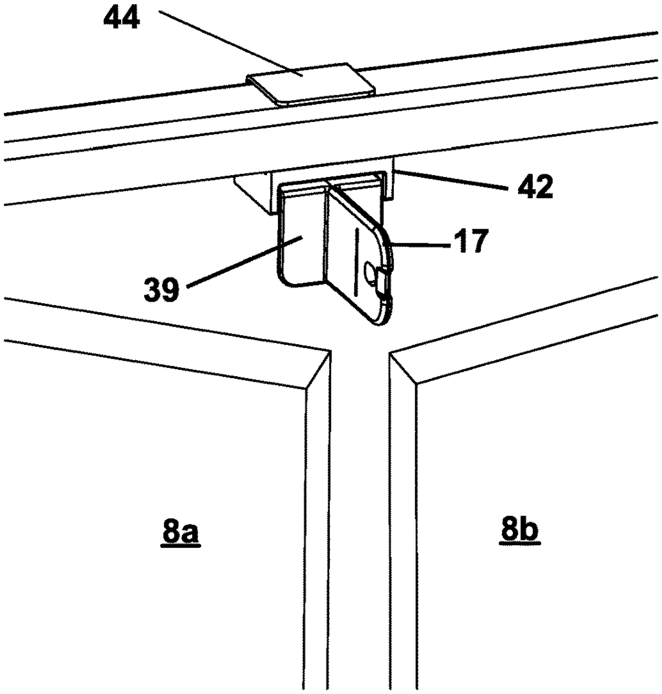
FIG. 18: shows a perspective view of the safety lock of FIG. 13 with the catch member removed and the cupboard doors open.
Figure 19:
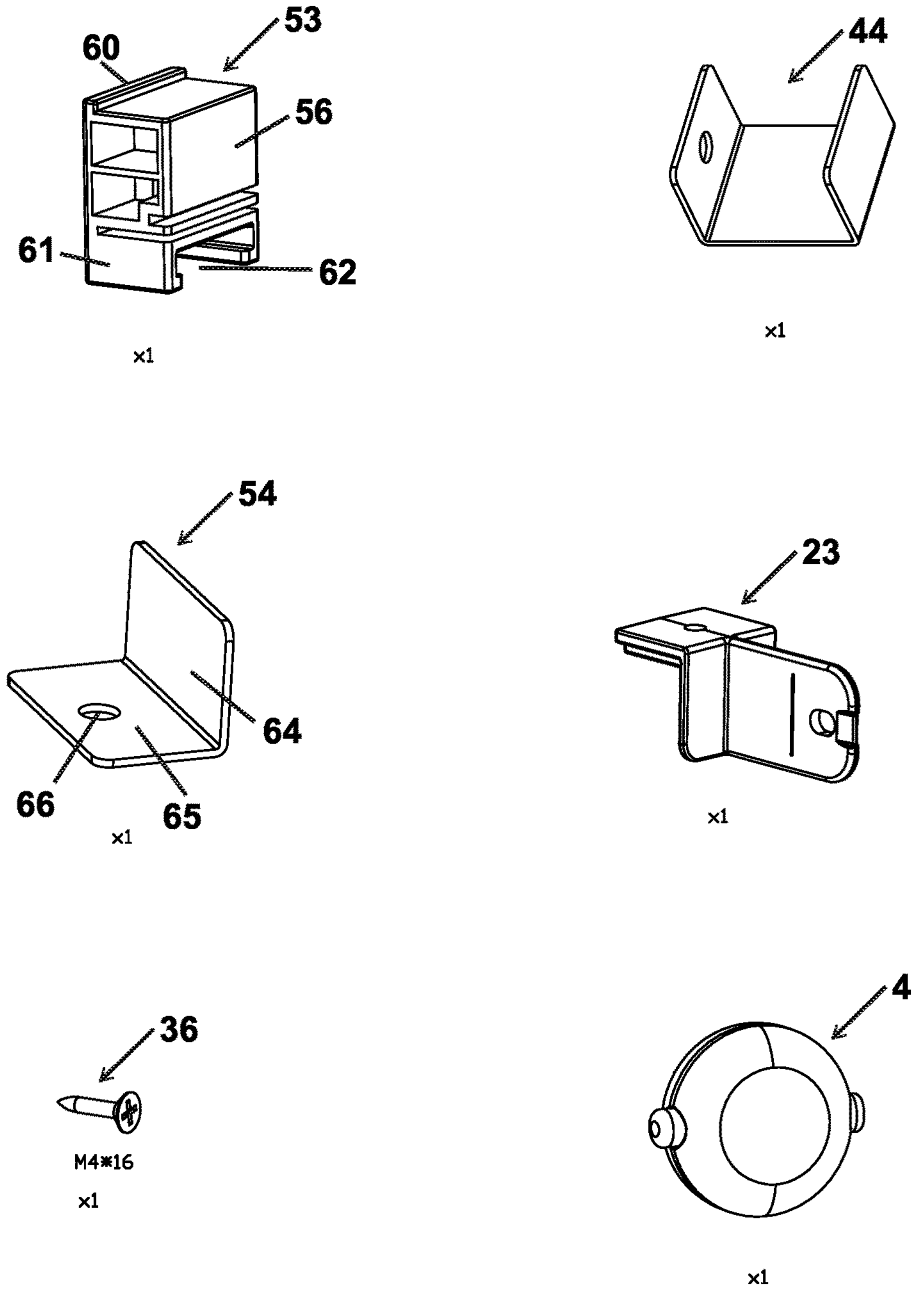
FIG. 19: shows a perspective view of a set of components of a fourth embodiment the safety lock of the invention.

By this means the latching protrusion 37 of the latch part 23, which in turn is arranged orthogonally to the tongue 33 and the supporting wall 39, extends outwardly between the cupboard doors 8*a*, 8*b*, in a fixed and secure state, such that the catch part 4 can be engaged with the protrusion 37 by means of the latching hole 38, by the user to secure the cupboard, in the same manner as in the first embodiment as shown in FIGS. 16 to 18.

Figure 22:
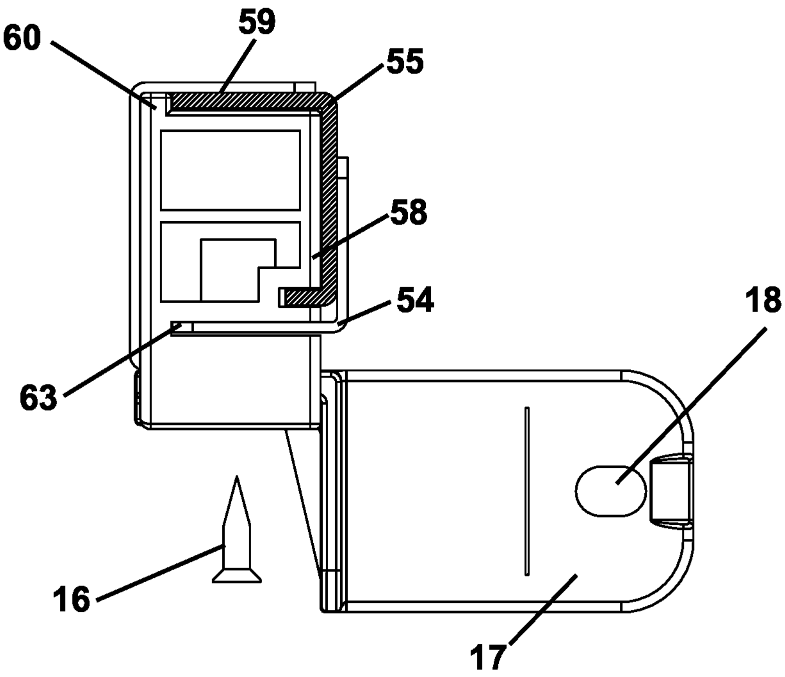
FIG. 22: shows a perspective view of a further subsequent step in the assembly of the latch member of the safety lock of the fourth embodiment.

FIGS. 19 to 25 show a retrofittable safety lock 21 according to a fourth embodiment of the invention in its six component parts including a rail attachment member 53, a C-shaped clamp 44, an L-shaped clamp 54, a screw 36, a catch member 4, which may be the same as in the first embodiment, and a latch part 23, which is also the same as in the previous embodiment. The L-shaped clamp 54 comprises first and second legs 64, 65 arranged orthogonally to each other with the first leg 64 comprising a through hole 66. In this fourth embodiment the safety lock is adapted to be fitted to cupboards which comprise a metal frame as shown in FIG. 22 which includes a horizontal frame element 55, which typically has an inverted U-shaped profile with open end of the U facing inside the cupboard and with as top side 59 longer than the bottom side 58 as shown in cross section in FIG. 22. In this embodiment the rail attachment member 53 is adapted to be attached to the horizontal frame element 55 by comprising means of shaped insert section 56 which is shaped to correspond with the internal section of the frame element 55 so that the insert section 56 fits snugly inside the frame element 55. The insert section 56 also includes a first slot 57 which is dimensioned to correspond with the external edge of the lower side 58 of the frame element 55 when the insert section 56 is fitted inside the frame element 55. In addition, the insert section 56 includes an upstanding stop 60 which is dimensioned to correspond with the external edge of the upper side 59 of the frame element 55 when the insert section 56 is fitted inside the frame element 55.

Figure 20:
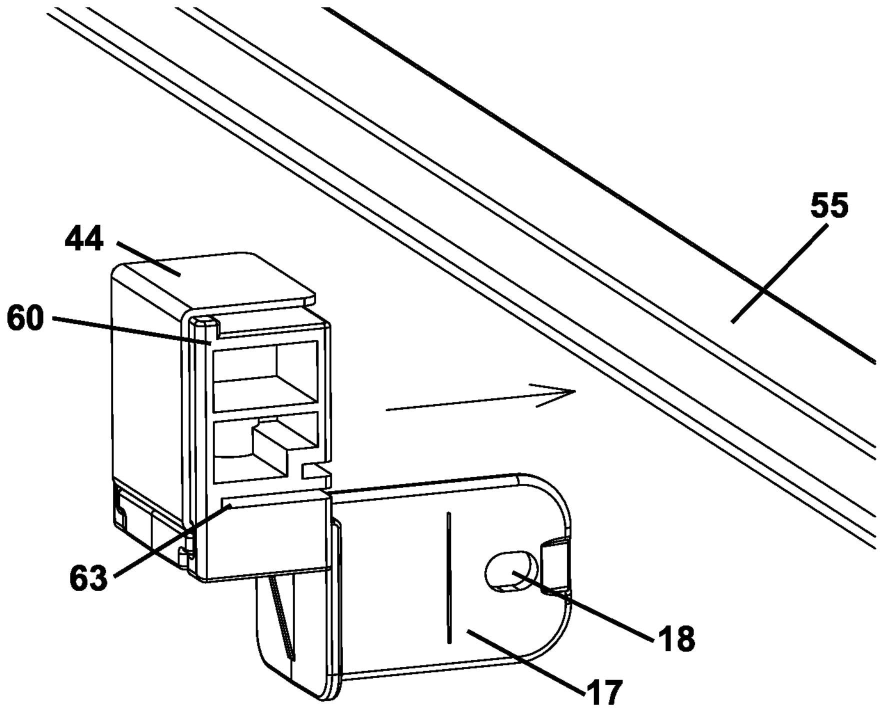
FIG. 20: shows a perspective view of a first step in the assembly of the latch member of the safety lock of the fourth embodiment.
Figure 21:
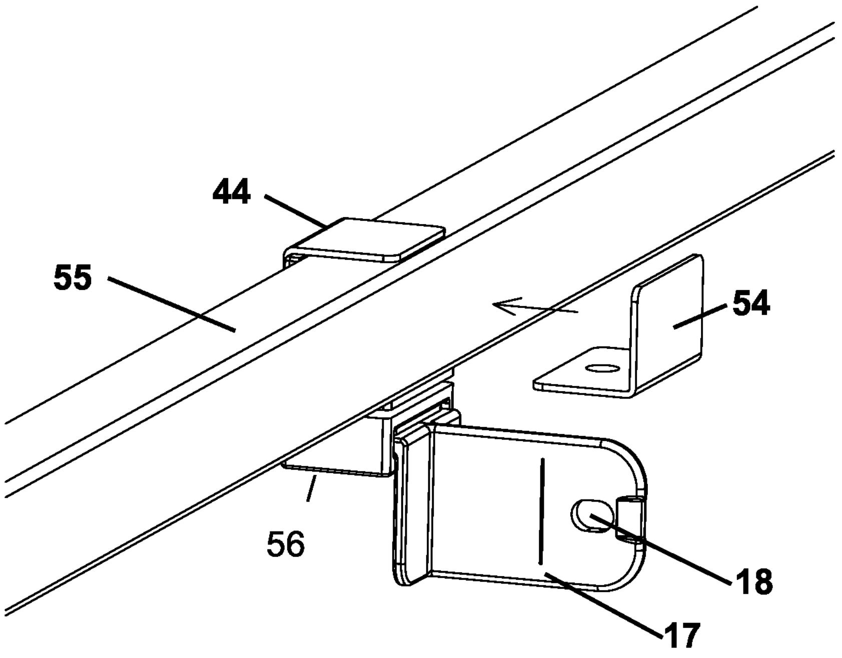
FIG. 21: shows a perspective view of a subsequent step in the assembly of the latch member of the safety lock of the fourth embodiment.

In this fourth embodiment, it can be seen that the same C-shaped clamp 44 is provided which includes two opposing clamp sides and a connecting base and one of the sides being provided with a clamp hole 50. As in the previous embodiment, the rail attachment member 53 also comprises a groove housing 61 comprising a groove 62 designed to receive a tongue 33 of the latch part 23, which tongue 33 comprises correspond flanges 34 on either side which snugly fit into the groove 62. The latch part 23 is the same as in previous embodiments and comprises a through hole 35 for receiving a retaining screw 36, so that to affix the latch part 23, the user slides the tongue 33 in the groove 62 as shown already done in FIG. 20. The tongue 33 and groove 62 are slid together to the fullest extent possible, as shown in FIGS. 20 and 22, and as determined by the supporting wall 39 at the end of the tongue 33. The groove 62 is dimensioned so that when the tongue 33 is in place there is sufficient room for the clamp side with the hole 50 of the clamp 44 to be slid into the same groove 62 above the tongue 33 so that together they snugly fit as shown in FIG. 22, with the other clamp side resting on the upper side 59 of the frame element 55 and the clamp hole 50 aligned with the through hole 35 in the latch tongue 33.

Additionally in this embodiment the insert section 56 of the rail attaching member 53 includes a second slot 63 which is deeper than the first slot 57 and deep enough to receive the first leg 64 of the L-shaped clamp 54. Thus, the user locates the tongue 37 and the c-shaped clamp side with the hole in the groove 62 and fits the assembled parts to the frame member 55 with the shirt side 58 inserted into the first slot 57 and then inserts the first leg 64 of the L-shaped clamp 54 into the second slot 63 such that the through holes 35, 50 and 66, of the tongue, C-shaped clamp side and first leg of the L-shaped clamp are all aligned. The user then screws in the retaining screw 36 through the through hole 35 and into the clamp hole 50 and the through hole 66 and further into the inside wall of the groove housing 61 thus securing the latch part 33 to the rail attachment member 53 and in turn securing both to the frame element 55 in a such a way that any rotation or sideways movement is prevented.

Figure 23:
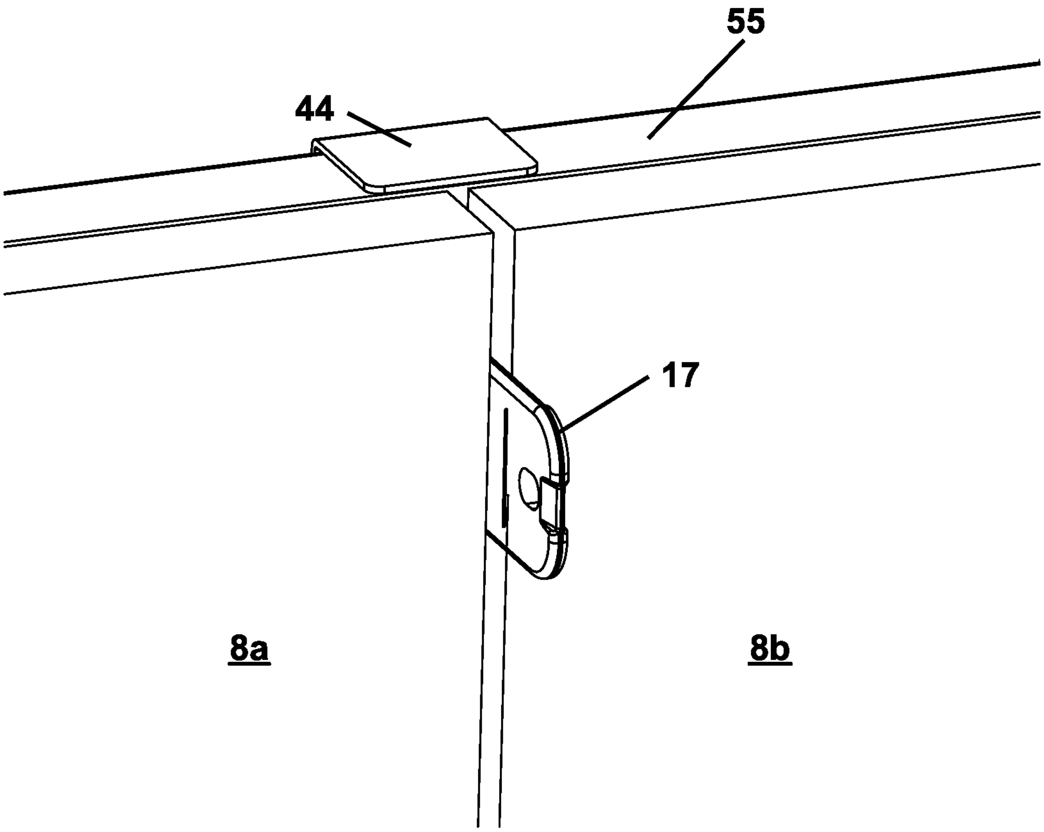
FIG. 23: shows a perspective view of the assembled latch member of the safety lock of FIG. 19. seen from the outside of the cupboard.
Figure 24:
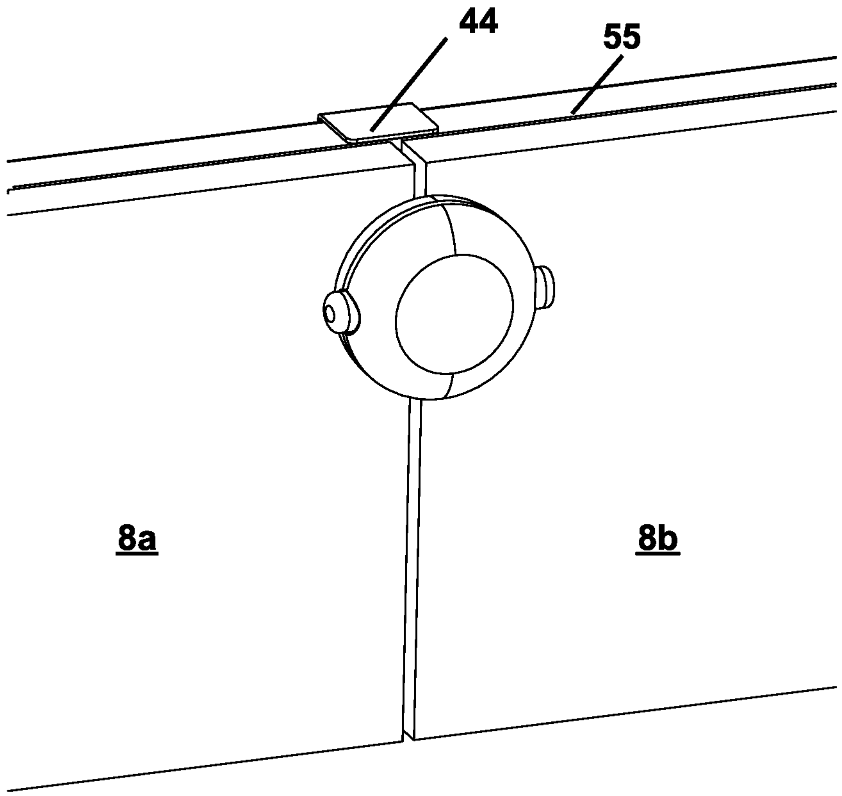
FIG. 24: shows a perspective view of the safety lock of FIG. 19 with the catch member attached.
Figure 25:
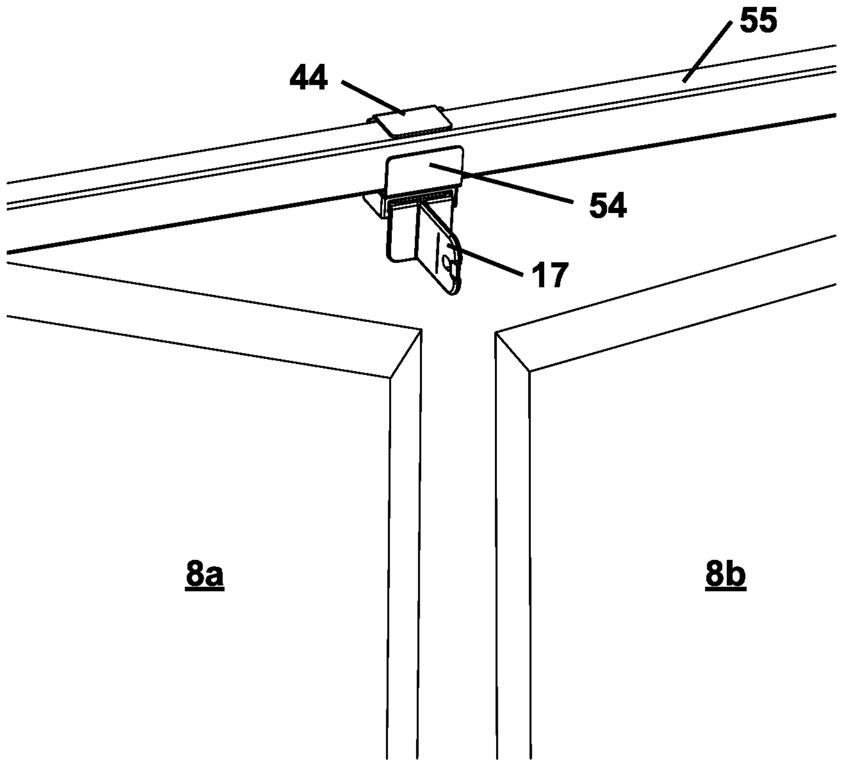
FIG. 25: shows a perspective view of the safety lock of FIG. 19 with the catch member removed and the cupboard doors open.
Figure 26:
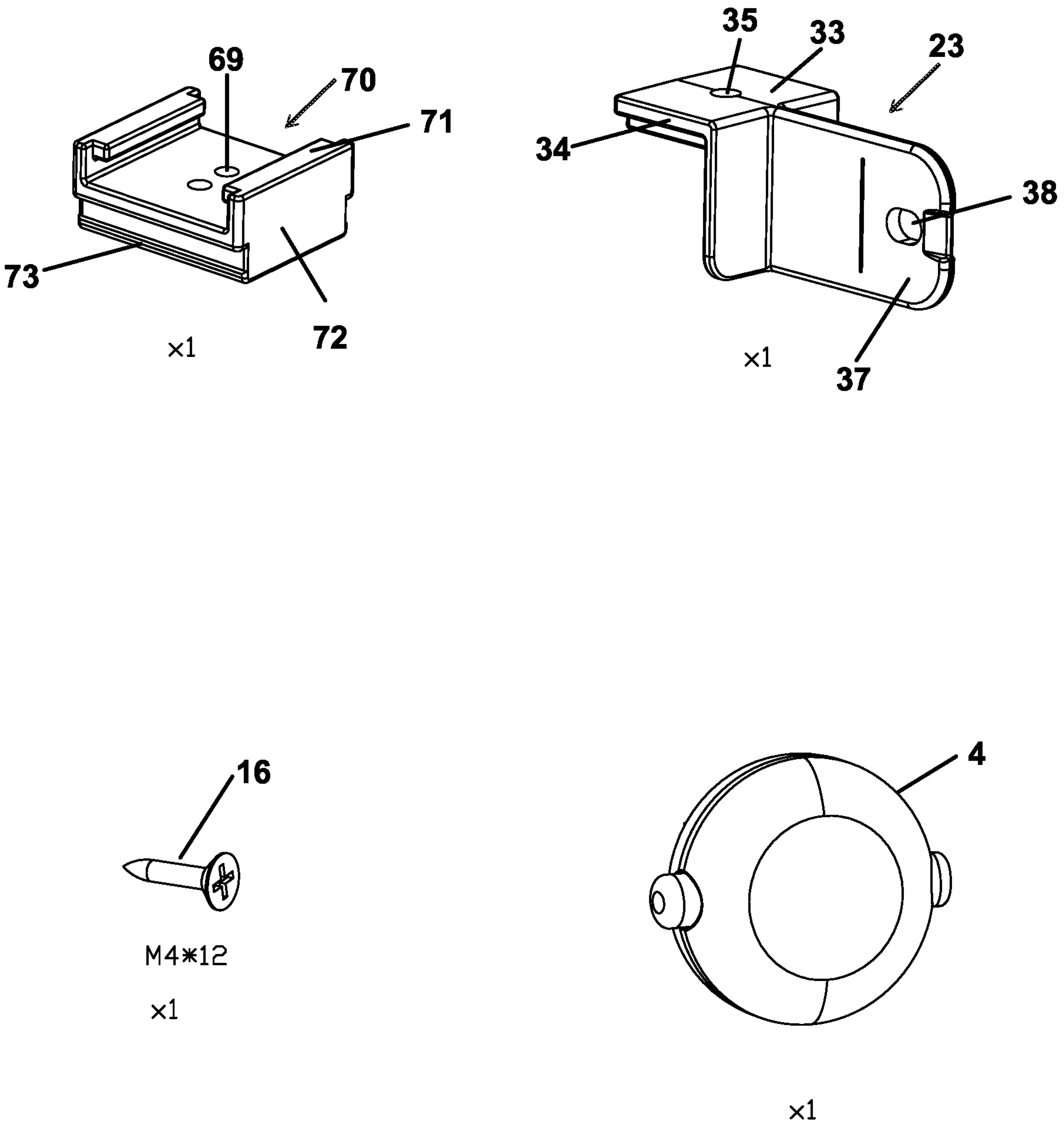
FIG. 26: shows a perspective view of a set of components of a fifth embodiment the safety lock of the invention.

As with the previous embodiments the latching protrusion 37 of the latch part 23, extends outwardly between the cupboard doors 8*a*, 8*b*, in a fixed and secure state, such that the catch part 4 can be engaged with the protrusion 37 by means of the latching hole 38 by the user to secure the cupboard, as shown in FIGS. 23 to 25.

Figure 27:
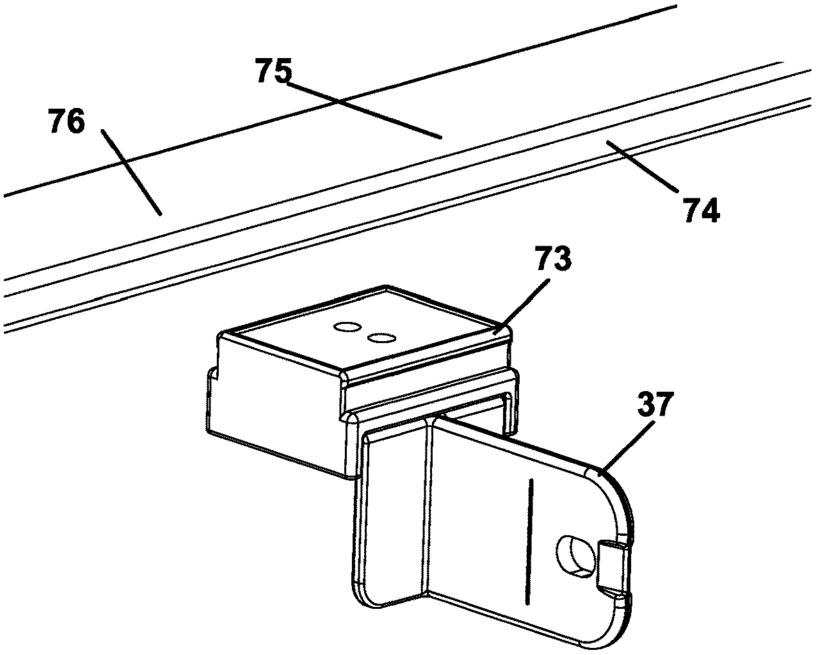
FIG. 27: shows a perspective view of a first step in the assembly of the latch member of the safety lock of the fifth embodiment.
Figure 28:
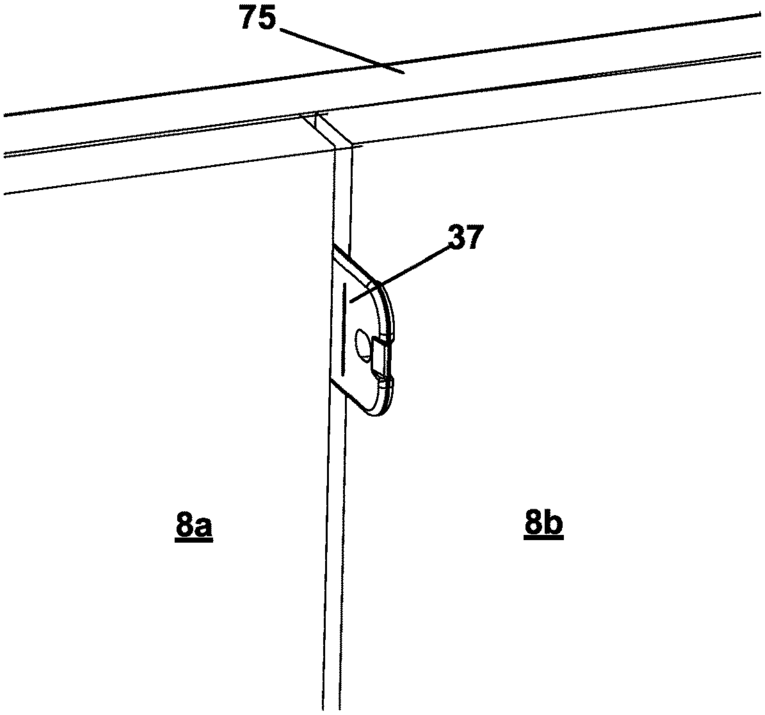
FIG. 28: shows a perspective view of the assembled latch member of the safety lock of FIG. 26. seen from the outside of the cupboard.

FIGS. 26 to 30 show a retrofittable safety lock 1 according to a fifth embodiment of the invention in its four component parts including a rail attachment member 72, a catch member 4, a screw 16, and a latch part 23. In this embodiment, the safety lock is adapted to be fitted to cupboards which comprise a metal rail as shown in FIGS. 27 and 28 which includes a horizontal frame element 75 having a shallow U-shaped channel 76 with the edge of the side walls forming a small inwardly directed lip (not shown). The rail attachment member 72 comprises an insert body portion 74 which is dimensioned to fit inside the U-shaped channel of the rail 75 and also includes elongate flanges 73 along each side which are dimensioned to be slightly over sized in relation to the inwardly facing lips of each side wall of the U-shaped channel such that by means of elastic deformation of the flanges 73 the rail attachment member can be pressed into the U-shaped channel of the rail 75 and be retained by the lips and side walls and permitted to moved lengthways along the channel 76. As in the previous embodiment, the rail attachment member 72 also comprises a groove housing 71 comprising a groove 70 designed to receive a tongue 33 of the latch part 23, which tongue 33 comprises correspond flanges 34 on either side which snugly fit into the groove 70. The latch part 23 is the same as in previous embodiments and comprises a through hole 35 for receiving a retaining screw 16, so that to affix the latch part 23, the user slides the tongue 33 in the groove 72 as shown already done in FIG. 27. The tongue 33 and groove 72 are slid together to the fullest extent possible, as shown in FIG. 27, and as determined by the supporting wall 39 at the end of the tongue 33.

The user then screws in the retaining screw 16 through the through hole 35 and into a smaller hole 69 in the inside wall of the groove housing 71 thus securing the tongue 33 to the rail attachment member 72 and in turn permitting the screw 16 to extend through the smaller hole 69 to the frame element 75 in a such a way that any sliding movement of the rail attachment member 72 when pressed into the channel 76 is prevented and rotation or sideways movement of the latching protrusion 37 is also prevented. Two smaller holes 69 are provided to permit the user to insert the tongue 33 into the groove 70 from either one off the two ends of the groove 70, and there is in both cases alignment of a smaller hole 69 with the through hole 35 when the latch member 23 is fully pressed into the groove 70.

Figure 29:
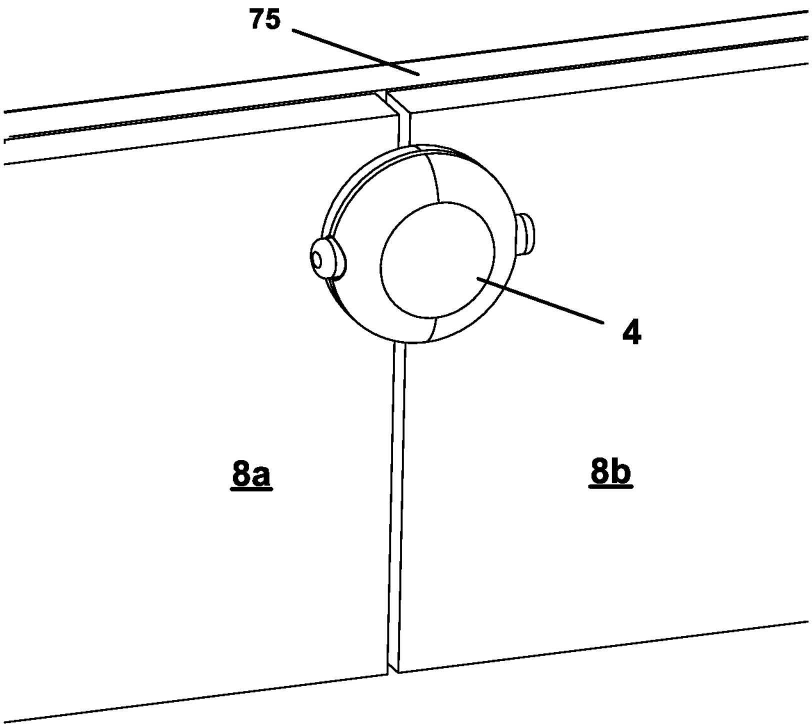
FIG. 29: shows a perspective view of the safety lock of FIG. 26 with the catch member attached.
Figure 30:
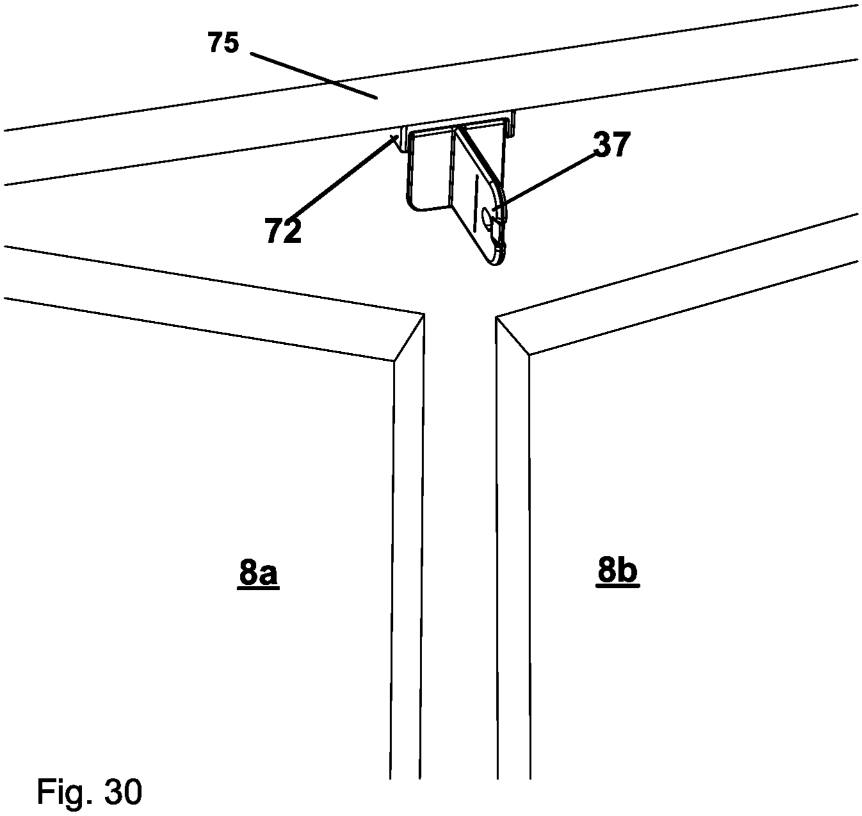
FIG. 30: shows a perspective view of the safety lock of FIG. 26 with the catch member removed and the cupboard doors open.

As with the previous embodiments the latching protrusion 37 of the latch part 23, extends outwardly between the cupboard doors 8*a*, 8*b*, in a fixed and secure state, such that the catch part 4 can be engaged with the protrusion 37 by means of the latching hole 38 by the user to secure the cupboard, as shown in FIGS. 28 to 30.

Another advantage of the invention is that lock is secured to the frame element of the cabinet, which allows the child safety lock to be installed without making alterations or securing to the outside surface of the cupboard or drawer. This is advantageous to preserve the outside appearance of the cupboard door and avoids the need to secure anything to the panel surfaces would damage the quality of the appearance.

COMPONENT LIST

1—Safety lock
2—Rail attachment member
3—Latch part
4—Catch member
5—Frame element
6—Horizontal lower edge
7—Planar surface
8*a*, 8*b*—Cupboard doors
9—Enlarged web
10—Attachment surface
11—Groove housing
11*a*—Abutment
12—Groove
13—Tongue
14—Flanges
15—Through hole
16—Retaining screw
17—Latching protrusion
18—Latching hole
19—Supporting wall
20—Reinforcing web
21—Retrofittable lock
22—Rail attachment member
23—Latch part
25—Frame element
26—Horizontal lower edge
29—Square shaped web
30—Attachment surface
31—Groove housing
32—Groove
33—Tongue
34—Flanges
35—Through hole
35*a*—Retaining hole
36—Retaining screw
37—Latching protrusion
38—Latching hole
39—Supporting wall
40—Reinforcing web
42—Rail attachment member
43—Insert section
44—C-shaped clamp
45—Horizontal frame element
46—Ledge
47—Ledge
48—Front side
49—Rear side
50—Clamp hole
51—Groove housing
52—Groove
53—Rail attachment member
54—L-shaped clamp
55—Frame member
56—Insert section
57—First slot
58—Short side
59—Long side
60—Upstanding stop
61—Groove housing
62—Groove
63—Second slot
64—First leg
65—Second leg
66—Through hole
69—Smaller holes
70—Groove
71—Groove housing
72—Rail attachment member
73—Flanges
74—Side walls
75—Rail
76—U-shaped Channel

The invention claimed is:

1. A child safety lock for a cupboard or drawer comprising at least one movable door or drawer and a fixed frame member, the child safety lock comprising: a latch member; a rail attachment member; a fixing screw; and a catch member, the latch member configured to be fitted on a surface of the fixed frame member by the rail attachment member and the fixing screw; the latch member including a laterally extending tongue, and the rail attachment member including a groove housing comprising a receiving groove which is dimensioned to receive the laterally extending tongue by a user sliding the laterally extending tongue into the receiving groove thus retaining the latch member and the rail attachment member together, and a through hole is provided centrally in the laterally extending tongue such that when the laterally extending tongue is located in the receiving groove the fixing screw may be screwed through the through hole and into the groove housing thus securing the latch member to the rail attachment member, wherein the safety lock also includes a C-shaped clamp which includes two opposing clamp sides and a connecting base, said C-shaped clamp configured such that one of the opposing clamp sides of the C-shaped clamp engages the fixed frame member and the other one of the opposing clamp sides of the C-shaped clamp engages the rail attachment member;

wherein said other one of the two opposing clamp sides of the C-shaped clamp that engages the rail attachment member is dimensioned to fit in the receiving groove, and the receiving groove has a height dimension which accommodates a combined thickness of the laterally extending tongue and said other one of the two opposing clamp sides of the C-shaped clamp.

2. A child safety lock according to claim 1, wherein the latch part includes a latching protrusion arranged orthogonally to the laterally extending tongue.

3. A child safety lock according to claim 1, wherein the latch part includes a supporting wall arranged orthogonally to the laterally extending tongue.

4. A child safety lock according to claim 3, wherein the latching protrusion is arranged orthogonally to the supporting wall.

5. A child safety lock according to claim 2, wherein the latching protrusion includes a through hole for receiving a catch part of the catch member.

6. A child safety lock according to claim 2, wherein the laterally extending tongue of the latch part includes diametrically opposed flanges which correspond with the receiving groove of the rail attachment member.

7. A child safety lock according to claim 1, wherein the rail attachment member includes an enlarged web which comprises an attachment surface.

8. A child safety lock according to claim 7, wherein the enlarged web extends orthogonally to the groove housing.

9. A child safety lock according to claim 1, wherein the rail attachment member includes a retaining hole which extends though the groove housing and allows the fixing screw to be screwed directly into the frame element.

10. A child safety lock according to claim 1, wherein the rail attachment member includes an insert section which corresponds to the internal dimensions of a U-shaped rail member in which it is to be fitted.

11. A child safety lock according to claim 1, wherein said other one of the two opposing clamp sides of the C-shaped clamp that engages the rail attachment member is provided with a clamp hole.

12. A child safety lock according to claim 1, wherein said other one of the two opposing clamp sides of the C-shaped clamp is provided with a clamp hole positioned such that when the at least one said other one of the two opposing clamp sides is fully inserted in the receiving groove, and the laterally extending tongue is inserted in the receiving groove in an opposite side of the receiving groove, the clamp hole and the through hole are aligned.

13. A child safety lock according to claim 10, wherein the safety lock includes an L-shaped clamp comprising first and second legs arranged orthogonally to each other, with the first leg comprising a through hole.

14. A child safety lock according to claim 13, wherein said first leg of said L-shaped clamp is dimensioned to fit in the receiving groove, and the receiving groove has a height dimension which accommodates the combined thickness of the laterally extending tongue, the at least one clamp side, and the first leg of the L-shaped clamp.

15. A child safety lock according to claim 14, wherein the first leg of the L-shaped clamp is dimensioned and the through hole of said first leg is positioned in the first leg such that when the first leg is fully inserted in the receiving groove, and the tongue is inserted in the receiving groove in a same side thereof, the clamp hole, the through hole of the laterally extending tongue and the through hole of the first leg of the L-shaped clamp are aligned.

* * * * *